Patented Oct. 14, 1952

2,614,100

UNITED STATES PATENT OFFICE 2,614,100

STABILIZED ACTIVATORS AND THEIR USE IN EMULSION POLYMERIZATION

Carl A. Uraneck, Borger, Charles M. Tucker, Phillips, and Willard M. St. John, Jr., Borger, Tex., assignors to Phillips Petroleum Company, a corporation of Delaware No Drawing. Application December 30, 1948, Serial No. 68,422

23 Claims. (Cl. 260—94.3)

This invention relates to polymerization of conjugated diolefins in aqueous emulsion. In one embodiment it relates to preparing synthetic rubber by emulsion polymerization using a highly active and stable activator system.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide. In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, and an emulsifying agent.

We have found that the oxidation catalyst used in such polymerization recipes is a very important part of the recipe, and that certain specific improvements in its preparation result in markedly increasing the rate of polymerization and frequently also favorably influence the characteristics of the reaction mixture. Usually this oxidation catalyst comprises a compound of a multivalent metal such as iron, manganese, copper, vanadium, cobalt, and the like, and most commonly is a water-soluble iron salt. The multivalent metal ion of such compounds can readily pass from a low valence state to a higher valence state, and vice versa. Sometimes the compound, when present in its lower valence state, can function in the dual role of reductant and oxidation catalyst.

One commonly used redox catalyst is iron pyrophosphate. In a redox system comprising hydrogen peroxide and organic mercaptan, used as oxidant and reductant respectively, ferric pyrophosphate, prepared by addition of a ferric salt to an aqueous solution of sodium pyrophosphate, has been found to be a useful catalyst. With another class of redox systems, comprising a cumene hydroperoxide (more formally designated "dimethyl (phenyl) hydroperoxymethane") and sugar, ferrous pyrophosphate has been found to be more effective as a catalyst, as is more fully discussed in Kolthoff application Serial No. 751,955, filed June 2, 1947. However, ferric pyrophosphate can also be used. When carrying out a polymerization with the ferrous system, certain difficulties are encountered. For example, if the catalyst is prepared in the form of a so-called "activator" solution by adding ferrous sulfate to an aqueous solution of sodium pyrophosphate, the solution must be used immediately, otherwise oxidation by the atmosphere destroys its potency. Impurities in the water, such as calcium salts, etc., likewise are deleterious. If the concentration of ferrous ion added to the system is greater than the concentration of the cumene hydroperoxide, i. e., if there is present more than one gram, or milligram, ion of ferrous ion per gram, or milligram, molecule of cumene hydroperoxide, polymerization is retarded. The excess of cumene hydroperoxide required for optimum operating conditions over the mol ratio of one to one is critical so that slight errors in measurement of these ingredients can easily cause great differences in the rate of polymerization and in the extent to which polymerization proceeds. However, it should be emphasized that if care is exercised in preparing the activator solution, consistent and high rates of polymerization can be obtained.

In preparing activator solutions, a ferrous or ferric salt is added to a solution of sodium pyrophosphate. Ferrous and ferric pyrophosphate are formed by metathesis and these compounds combine further to form pyrophosphate complexes, such as the well known soluble ferric pyrophosphate, $Fe_4(P_2O_7)_3 \cdot 3Na_4P_2O_7 \cdot xH_2O$. For this reason it has become customary to speak of ferrous pyrophosphate and ferric pyrophosphate activators without specifying the source of the ferrous or ferric ions, that is, whether derived from ferrous sulfate or some other salt, and without specifying to what extent the resulting pyrophosphates have been complexed. It can be mentioned that the aforementioned "soluble ferric pyrophosphate" has been found to be a very convenient source of ferric ions for the preparation of ferric activators.

With ferrous pyrophosphate, a molecular excess of cumene hydroperoxide with respect to ferrous ion must be present to obtain optimum polymerization. With ferric pyrophosphate, on the other hand, this limitation is absent and polymerization can be conducted with amounts of cumene hydroperoxide which are much lower than are required with an equivalent concentration of ferrous salt. However, under the best attainable conditions the rate of polymerization is ordinarily no faster than about 67 per cent of what can be obtained with ferrous pyrophosphate. It might be thought that a mixture of ferrous and ferric salts would possess certain advantages and such indeed has been found to be the case. With such mixtures the limiting ratio of cumene hydroperoxide to iron can be lowered without adversely affecting the high rates of polymerization obtainable with ferrous pyrophosphate activation.

We have now found that, when an emulsion polymerization of a conjugated diolefin is carried out to produce synthetic rubber in a system containing an oxidant and an oxidation catalyst such as just discussed, surprising improvements are obtained in the polymerization rate, and also often fluidity of the resulting latex, when certain inorganic water soluble salts which have reducing properties are incorporated in the activator solution which contains the oxidation catalyst. According to our invention, the activator solution is prepared by dissolving in water a salt of a multivalent metal such as previously discussed, a pyrophosphate of a monovalent cation, such as alkali metal or ammonium, and a salt of a monovalent cation and an inorganic anion which is a reducing agent, such as a hypophosphite, thiosulfate, sulfite, bisulfite, or hyposulfite. This reducing salt is also preferably a salt of an alkali metal or ammonium, and its presence so stabilizes the activator composition that an inert atmosphere is no longer necessary during its preparation and storage. When operating according to the method of this invention, ferrous pyrophosphate activators, and the like, can be prepared and stored in the presence of air with substantially no indications of oxidation and therefore no loss of activity. In fact, in many instances the reaction rate is increased when these stabilized activators are employed in polymerization reactions. These activators are unusually versatile in that they are applicable in recipes containing very small amounts of iron, or other multivalent metal, say 0.01 millimol of salt per 100 grams of monomers, or they may be employed when the multivalent metal content is as high as 3.0 millimols per 100 grams of monomers. These inorganic reducing salts, used in accordance with our invention, should have no adverse effect upon the other salts, especially the multivalent metal. Thus, they should not form an insoluble precipitate with the multivalent metal ion when it is present in either a low or a high valence state. If a reducing salt is used which has a reducing action on the multivalent metal when it is present in a high valence state, the salt should be chosen so that resulting reaction products are not harmful to the polymerization reaction and a sufficient amount of salt should be used so that a substantial proportion does not enter into such a reaction. We prefer to prepare the activator solution with the multivalent metal in its lower valence state, and in such instances the use of a separate reductant in the polymerization system is frequently unnecessary, particularly when operating at subfreezing polymerization temperature with an alcohol present in the aqueous medium. When the activator solution is prepared with a salt of a multivalent metal in its higher valence state it is usually necessary also to have a reductant, such as a reducing sugar, present while the solution is heated. If desired such a reductant may also be present when the multivalent metal is present in its lower valence state.

The additional ingredient is preferably incorporated into the activator solution prior to heating, but beneficial stabilizing effects result if it is added to the solution after heating, if this heating is carried out in the absence of contact with free oxygen. When the components are mixed prior to heating and the resulting solution is heated in the presence of air, the resulting composition can be stored for a period of from several hours to several days, say 7 to 15 days, with substantially no loss of activity. If desired inert gas blanketing may be employed during the mixing, heating, or storage of the activator composition but this practice is not considered necessary. Indeed one of the chief advantages of the invention is that the activator can be prepared in the presence of free oxygen. In order to get our improved results to the greatest extent it is necessary to add the multivalent metal salt, pyrophosphate, and third salt to water and then to heat the resulting solution to a temperature between 40 and 100° C.

An object of this invention is to polymerize unsaturated organic compounds. Another object of this invention is to produce an improved synthetic rubber. Still another object of this invention is to increase the reaction rate in polymerizing unsaturated organic compounds in aqueous emulsion. An additional object of this invention is to produce a more fluid synthetic rubber latex when effecting emulsion polymerization at subfreezing temperatures. Still another object of this invention is to produce a more active activator solution for use in emulsion polymerization, where an oxidant is an essential ingredient of the polymerization mixture. A further object of this invention is to provide, and use, activator compositions comprising a pyrophosphate of a multivalent metal, which is stable in the presence of free oxygen. A still further object of our invention is to provide, and use, a stable ferrous pyrophosphate activator solution for use in emulsion polymerization. Further objects and advantages of this invention will become apparent, to one skilled in the art, from the accompanying disclosure and discussion.

In effecting emulsion polymerization of a monomeric material, particularly when a batch-type or semibatch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solution and oxidant intermittently, or continuously, during the course of the reaction. If the operation is carried out continuously, streams of the various ingredients are admixed in somewhat the same order prior to their final introduction into the polymerization reaction zone.

The activator solution which is prepared in accordance with our invention is usually prepared entirely separately and somewhat prior to its use in the polymerization reaction. Each ingredient is dissolved in water in a concentration between about 0.1 and 10 parts by weight per 100 parts of water used for the activator solution. The three essential ingredients hereinbefore discussed are added to water and the resulting solution heated to a temperature between 40 and 100° C., preferably between 50 and 80° C., for a period of from 5 to 90 minutes, more usually from 30 to 60 minutes. In the majority of cases, the salt of the multivalent metal and the pyrophosphate are present in an amount ranging from 0.8 to 1.2 mols with respect to one mol of the other, and the resulting activator solution and oxidant are subsequently added to the polymerization zone in amounts so that the relative amounts of these materials are within the same range. It is usually preferred that the amounts of multivalent metal ion and pyrophosphate be present in equimolar quantities, and the amount of oxidant be in excess of the molecular equivalent of the multivalent metal and pyrophosphate. We prefer to see to it that the strength of our activator solution is so regulated, and the amount of the activator solution added is also so regulated, that there is added to the reaction mixture from 0.01 to 3 millimol parts of multivalent metal and pyrophosphate and oxidant per 100 parts by weight of monomeric material, with the preferred quantities being in the range from 0.1 to 0.65 millimol parts by weight of multivalent metal. The amount of reducing salt present in the activator composition, that is, the hypophosphite, thiosulfate, or other compound hereinbefore mentioned, is often expressed in relationship to the monomers employed. The quantity of this ingredient will generally not exceed one part per 100 parts of monomers and in most instances the amount required to produce stabilization of the activator is less than 0.5 part, say from 0.02 to 0.30 part. In considering the amounts of these materials, the same units of weight should be used. That is, if the monomeric material is measured in pounds, these other materials are measured in millipound mols.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

It is usually preferred that the multivalent ion be iron, and the activator solution may be prepared from any of the readily available soluble iron salts, such as ferrous sulfate, ferric sulfate, ferrous nitrate, and the like. A pyrophosphate of sodium or potassium is also usually used in preparing the activator solution. Apparently the ferrous salt and the pyrophosphate inter-react to form some kind of a complex compound. The third salt added in accordance with the present invention not only tends to stabilize the aqueous solution of such a complex from deleterious effects of free oxygen, but may also influence in some way the composition or molecular structure of the resulting complex. Previous experience with the preferred types of recipes has indicated that it is necessary to incorporate at least 0.3 part by weight of iron salt in the reaction mixture per 100 parts of monomers in order to obtain satisfactory reaction rates and conversions. This corresponds to at least about 1.1 millimol parts of iron per 100 parts of monomers charged to the reaction system. We have discovered that when the activator solution is prepared as disclosed herein, satisfactory results can be obtained with an amount of iron no greater than 0.5 millimol parts per 100 parts of monomers charged. As a result, the final polymer product contains a substantially lower quantity of iron, which is distinctly desirable insofar as the properties of the resulting rubber product are concerned.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivates thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 180 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gel at low reaction temperatures, a larger proportion of aqueous phase should be used. It is generally preferred that the emulsion be of an "oil in water" type, with the ratio of aqueous medium to monomeric material between about 1.5:1 and about 2.75:1, in parts by weight. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 85 per cent of the monomeric material is polymerized.

Emulsifying agents which are applicable in these low temperature polymerizations are materials such as potassium laurate, potassium oleate, and the like. However, other emulsifying agents, such as non-ionic emulsifying agents, salts of alkyl aromatic sulfonic acids, salts of alkyl sulfates, and the like which will produce favorable results under the conditions of the reaction, can also be used in practicing the invention.

The pH of the aqueous phase may be varied over a rather wide range without producing deleterious effects on the conversion rate or the properties of the polymer. In general the pH may be within the range of 9.0 to 11.8, with the narrower range of 9.5 to 10.5 being most generally preferred.

The mercaptans applicable in this invention are usually alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Temperatures applicable for the operation of this invention may range from $-40$ to $+70°$ C., with the range $-20$ to $+5°$ C. being preferred.

Our new activator solutions can be used to advantage in systems wherein the oxidizing agent is a peroxidic-type material, or a compound which functions in the capacity of an oxidizing agent, such as a diazothioether which is soluble in a liquid hydrocarbon material, such as liquid butadiene. We prefer to use organic peroxides and hydroperoxides, such as may be represented by the formula $R'OOR''$, where $R'$ may be an alkyl, aryl, acyl, aralkyl, or cycloalkyl group, and R″ may be hydrogen or an alkyl, aryl, acyl, aralkyl, or cycloalkyl group. Specific examples of these compounds include benzoyl peroxide, tertiary butyl hydroperoxide, cumene hydroperoxide, (phenyldimethyl methyl hydroperoxide), and methyl cyclohexane hydroperoxide. Preferred diazothioethers include 2-(4-methoxybenzene diazothiomercapto) - naphthalene, 1-(2,4-dimethylbenzene diazomercapto)-naphthalene, and the like.

Advantages of this invention are illustrated by the following examples. The reactants, and their proportions, and the other specific ingredients of the recipes are presented as being typical and should not be construed to limit the invention unduly.

Example I

The following recipe was employed for carrying out a butadiene-styrene copolymerization reaction at −10° C.

| | Parts by weight |
|---|---|
| Butadiene | 71 |
| Styrene | 29 |
| Water | 180 |
| Methanol | 40 |
| Potassium laurate | 5.0 |
| Mercaptan blend [1] | Variable |
| Cumene hydroperoxide | 0.264 (1.75 millimols) |
| Condensed alkyl aryl sulfonic acid sodium salt [2] | 0.02 |
| Activator solution: | |
| Ferrous sulfate, FeSO$_4$·7H$_2$O | 0.31 (1.11 millimols) |
| Sodium pyrophosphate, Na$_4$P$_2$O$_7$ | 0.336 (1.26 millimols) |
| Sodium hypophosphite, NaH$_2$PO$_2$·H$_2$O | 0.084 |

[1] A blend of tertiary C$_{12}$, C$_{14}$, and C$_{16}$ aliphatic mercaptans in a ratio of 3 : 1 : 1 parts by weight.
[2] Daxad-11.

The activator was prepared in the presence of air by dissolving the ferrous sulfate in 12 parts water and adding it to a mixture of the sodium pyrophosphate and sodium hypophosphite previously dissolved in 12 parts water. The resulting mixture was heated to 60° C. and allowed to cool before being used. When carrying out a polymerization, all materials were charged to the reactor in the conventional manner, the cumene hydroperoxide being added after the temperature was adjusted to −10° C.

Several parallel runs were made as follows: (a) Run I, activator used immediately after preparation; (b) run II, activator aged in air 18 hours before use; (c) run III, activator used immediately after preparation; (d) run IV, activator made up under nitrogen atmosphere and used immediately after preparation; (e) run V, activator made up under nitrogen atmosphere and aged in air 14.5 hours before use; (f) run VI, control activator prepared under nitrogen atmosphere without sodium hypophosphite (0.42 part sodium pyrophosphate used). The results were as follows:

| Run No. | Mercaptan Blend, Parts | Time to Reach 60% Conversion, Hours |
|---|---|---|
| I | 0.10 | 11.2 |
| II | 0.10 | 11.8 |
| III | 0.20 | 11.4 |
| IV | 0.16 | 12.4 |
| V | 0.14 | 12.5 |
| VI | 0.20 | 14.2 |

Two further parallel runs were made, using slightly different recipes, in which the activator did not contain a stabilizer. In one case nitrogen blanketing was used during the preparation of the activator while in the other case no method of protection was employed except that the activator was prepared in a closed container. The recipe was as follows:

| | Parts by weight |
|---|---|
| Butadiene | 70 |
| Styrene | 30 |
| Water | 150 |
| Methanol | 30 |
| Potassium laurate | 5.0 |
| Mercaptan blend [1] | 0.18 |
| Cumene hydroperoxide (100%) | 0.19 |
| Activator solution: | |
| Ferrous sulfate, FeSO$_4$·7H$_2$O | 0.31 |
| Sodium pyrophosphate, Na$_4$P$_2$O$_7$ | 0.42 |
| Potassium chloride | 0.4 |

[1] A mixture of tertiary C$_{12}$, C$_{14}$, and C$_{16}$ aliphatic mercaptans in a ratio of 3 : 1 : 1 parts by weight.

In the first run, the activator solution was prepared by charging the sodium pyrophosphate, ferrous sulfate, and 24 parts water to a closed container, and the mixture stirred vigorously while it was heated in contact with a small amount of air in the container, at 60° C. for 40 minutes. The potassium laurate, potassium chloride, methanol, and the remainder of the water were mixed and added, with the activator solution, to a reactor after which the styrene and mercaptan were charged. The butadiene was then added, the temperature adjusted to −10° C., and the cumene hydroperoxide introduced. No polymerization had occured at the end of 12 hours.

The second parallel run was made using the same recipe and technique, but in this case the activator solution was blanketed with nitrogen during its preparation and the mixture was agitated only mildly. Polymerization was effected at −10° C. according to the conventional technique. A conversion of 59 per cent was obtained in 14.9 hours.

These results, considered together with the previously presented runs, show the deleterious effects of air (free oxygen) upon the activator solution when no reducing salt is used, and also the fact that the use of a reducing salt in the activator solution obviates this deleterious action of free oxygen.

Example II

The first recipe of Example I was followed except that sodium thiosulfate was used in the activator system instead of sodium hypophosphite and the activator was prepared under nitrogen atmosphere. The amount of mercaptan blend employed in this run was 0.11 part. Polymerization was carried out at −10° C. as in the preceding runs. A 60 per cent conversion was obtained in 13.2 hours.

Example III

Butadiene was copolymerized with styrene at −10° C. according to the following recipe:

| | Parts by weight |
|---|---|
| Butadiene | 70 |
| Styrene | 30 |
| Water | 180 |
| Methanol | 40 |
| Potassium laurate, pH 9.4 | 5.0 |

| | Parts by weight |
|---|---|
| Mercaptan blend [1] | 0.12 |
| Cumene hydroperoxide | 0.21 (1.38 millimols) |
| Activator solution: | |
|   Ferrous sulfate, $FeSO_4 \cdot 7H_2O$ | 0.31 (1.11 millimols) |
|   Sodium pyrophosphate, $Na_4P_2O_7$ | 0.30 (1.12 millimols) |
|   Sodium hypophosphite, $NaH_2PO_2 \cdot H_2O$ | 0.08 |
|   Condensed alkyl aryl sulfonic acid sodium salt | 0.02 |
|   Potassium chloride | 0.4 |

[1] See Example I.

Polymerization was carried out in the usual manner. A 70 per cent conversion was reached in 12.7 hours.

Example IV

A polymerization run was effected at —10° C. according to the following formulation:

| | Parts by weight |
|---|---|
| Butadiene | 70 |
| Styrene | 30 |
| Water | 180 |
| Methanol | 40 |
| Potassium laurate | 5.0 |
| Mercaptan blend [1] | 0.12 |
| Cumene hydroperoxide | 0.095 (0.60 millimol) |
| Activator solution: | |
|   Ferrous sulfate, $FeSO_4 \cdot 7H_2O$ | 0.14 (0.50 millimol) |
|   Sodium pyrophosphate, $Na_4P_2O_7$ | 0.136 (0.51 millimol) |
|   Sodium hypophosphite, $NaH_2PO_2 \cdot H_2O$ | 0.036 |
|   Condensed alkyl aryl sulfonic acid sodium salt | 0.02 |
|   Potassium chloride | 0.4 |

[1] See Example I.

A 59.7 per cent conversion was reached in 9.8 hours.

A second polymerization run was carried out using 0.036 part sodium thiosulfate instead of the same quantity of sodium hypophosphite. A 59.6 per cent conversion was reached in 10.4 hours.

These results show that the stabilized activators give excellent conversion rates at low initiator levels.

Example V

Polymerization at —17.7° C. was effected according to the following recipe:

| | Parts by weight |
|---|---|
| Butadiene | 71 |
| Styrene | 29 |
| Water | 180 |
| Methanol | 60 |
| Potassium laurate | 6.0 |
| Mercaptan blend [1] | 0.12 |
| Cumene hydroperoxide | 0.21 (1.38 millimols) |
| Activator solution: | |
|   Ferrous sulfate, $FeSO_4 \cdot 7H_2O$ | 0.31 (1.11 millimols) |
|   Sodium pyrophosphate, $Na_4P_2O_7$ | 0.30 (1.12 millimols) |
|   Sodium hypophosphite, $NaH_2PO_2 \cdot H_2O$ | 0.08 |
|   Condensed alkyl aryl sulfonic acid sodium salt | 0.02 |
|   Potassium chloride | 0.2 |

[1] See Example I.

A conversion of 61.4 per cent was obtained in 19 hours.

Example VI

Polybutadiene, modified with tertiary hexadecyl mercaptan, was prepared as follows:

| | Parts by weight |
|---|---|
| Butadiene | 100 |
| Water | 180 |
| Methanol | 40 |
| Potassium laurate | 5.0 |
| Tertiary $C_{16}$ mercaptan | 0.45 |
| Cumene hydroperoxide | 0.21 (1.38 millimols) |
| Activator solution: | |
|   Ferrous sulfate, $FeSO_4 \cdot 7H_2O$ | 0.31 (1.11 millimols) |
|   Sodium pyrophosphate, $Na_4P_2O_7$ | 0.30 (1.12 millimols) |
|   Sodium thiosulfate, $Na_2S_2O_3 \cdot 5H_2O$ | 0.08 |
|   Condensed alkyl aryl sulfonic acid, sodium salt | 0.02 |
|   Potassium chloride | 0.4 |

Polymerization was effected at —10° C. A 60 per cent conversion was obtained in 15.2 hours. The polymer had a Mooney value of 66.

Example VII

Butadiene (90 parts) was copolymerized with styrene (10 parts) according to the recipe of Example VI except that 0.8 part tertiary $C_{16}$ mercaptan was employed instead of 0.45 part. Polymerization was effected at —10° C. A 60 per cent conversion was obtained in 14.1 hours.

Example VIII

The following recipe was employed for carrying out a copolymerization of butadiene with styrene at —10° C.

| | Parts by weight |
|---|---|
| Butadiene | 70 |
| Styrene | 30 |
| Water | 192 |
| Methanol | 48 |
| Potassium laurate, 95% neutralized | 5.0 |
| Mercaptan blend [1] | 0.25 |
| Cumene hydroperoxide | 0.084 (0.55 millimol) |
| Activator solution: | |
|   Ferrous sulfate, $FeSO_4 \cdot 7H_2O$ | 0.139 (0.50 millimol) |
|   Sodium pyrophosphate, $Na_4P_2O_7 \cdot 10H_2O$ | 0.223 (0.50 millimol) |
|   Sodium hypophosphite, $NaH_2PO_2 \cdot H_2O$ | 0.40 |

[1] See Example I.

The time-conversion data were as follows:

| Time, Hours | Conversion, Percent |
|---|---|
| 2.4 | 11 |
| 5.4 | 28 |
| 7.4 | 40 |
| 10.3 | 57 |
| 23.3 | 84 |

A similar run was made using 0.25 part sodium pyrophosphate. The following results were obtained:

| Time, Hours | Conversion, Percent |
|---|---|
| 2.4 | 10 |
| 5.4 | 27 |
| 7.4 | 37 |
| 10.3 | 50 |
| 23.3 | 72 |

Example IX

Three activators were prepared in the following manner:

I. A mixture of 3.1 grams $FeSO_4.7H_2O$, 5.0 grams $Na_4P_2O_7.10H_2O$, 1 gram $NaHSO_3$, and sufficient water to make 100 ml. of solution was prepared under nitrogen and heated at 60° C. for 40 minutes.

II. Sodium hyposulfite was substituted for sodium bisulfite in I.

III. A control activator was prepared by heating a mixture of 3.1 grams $FeSO_4.7H_2O$, 7.0 grams $Na_2P_4O_7.10H_2O$, and sufficient water to make 100 ml. of solution at 60° C. for 40 minutes under an atmosphere of nitrogen.

After being stored in air 24 hours, the solutions in activators I and II were water white and no crust had formed on the precipitate. In the control activator the solution was bright yellow and a crust had formed on the precipitate. After being stored the control activator had oxidized to such an extent that it would not give satisfactory results when employed in a polymerization reaction. No noticeable reduction in activity was observed with the first two activators.

Example X

A series of polymerization runs was carried out at −10° C., using the following recipe:

| | Parts by weight |
|---|---|
| Butadiene | 70 |
| Styrene | 30 |
| Water | 192 |
| Methanol | 48 |
| Potassium laurate (95% neutralized) | 5.0 |
| Mercaptan blend [1] | 0.25 |
| Cumene hydroperoxide | 0.084 (0.55 millimol) |
| Activator solution: | |
|   Ferrous sulfate, $FeSO_4.7H_2O$ | |
|   Sodium pyrophosphate, $Na_4P_2O_7.10H_2O$ | (Variable) |
|   Sodium hypophosphite, $NaH_2PO_2.H_2O$ | |

[1] A mixture of $C_{12}$, $C_{14}$, and $C_{16}$ tertiary aliphatic mercaptans in the ratio of 3:1:1 parts by weight.

A series of activator solutions was prepared, each by dissolving the ingredients in water and heating the resulting solution at 60° C. for 40 minutes. In each instance the ferrous sulfate and sodium pyrophosphate were present in equimolar quantities. The activator solutions were so prepared, and subsequently added in such amounts, that the ingredients were added to the reaction mixture in the amounts indicated in the following table. The polymerization results (conversion) are also recorded in the table.

| Ferrous Sulfate / Sodium Pyrophosphate | Percent Conversion at 7.2 hours | | |
|---|---|---|---|
| | 0.5 millimol | 1.0 millimol | 2.5 millimol |
| Sodium Hypophosphite (Parts by Weight): | | | |
| 0 | 24 | 38 | 49 |
| 0.15 | 35 | 44 | 42 |
| 0.20 | 38 | 43 | 35 |
| 0.25 | 39 | 43 | 30 |

These results show that at the 0.5 millimol initiator level sodium hypophosphite accelerates the reaction, at the 1.0 millimol level it has much less effect, and at the 2.5 millimol level it behaves as a retarder. A method has therefore been provided for increasing the rate of reaction of low iron content recipes. Reference to these data also reveals that the iron content of the recipe must be doubled in order to obtain the same rate that can be obtained by the addition of sodium hypophosphite to the 0.5 millimol level recipe.

As will be evident to those skilled in the art, various modifications of this invention can be made, or followed, in the light of the foregoing disclosure and discussion, without departing from the spirit or scope of the disclosure or from the scope of the claims.

We claim:

1. A process for polymerizing an organic monomeric material comprising an unsaturated organic compound containing a $CH_2=C<$ group while dispersed in an aqueous medium, which comprises polymerizing such a monomeric material while dispersed in an aqueous medium in the presence of an oxidant and in the presence of an activator composition prepared by dissolving in water a salt of a multivalent metal capable of existing in two valence states under such conditions that it is present at least in part in a lower valence state together with a pyrophosphate of a monovalent cation selected from the class consisting of alkali metals and ammonium and with a reducing salt of a monovalent cation selected from the class consisting of alkali metals and ammonium and of an inorganic anion selected from the class consisting of hypophosphite, thiosulfate, sulfite, bisulfite and hyposulfite, heating said solution to 40 to 100° C. for 5 to 90 minutes and subsequently cooling said solution, and adding the cool solution to said aqueous dispersion, the amount of said solution added and the amount of said constituents present in said dispersion being such that, per 100 parts by weight of said monomeric material, there is added 0.01 to 1 millimol part of each of said multivalent metal and pyrophosphate and 0.02 to 1 part of said reducing salt, and said oxidant is present in an amount in excess of one molecular equivalent of said multivalent metal.

2. The process of claim 1 wherein said polymerization is conducted below 0° C. in the presence of an organic hyproperoxide as said oxidant.

3. The process of claim 1 in which said different salt is a hypophosphite of an alkali metal.

4. The process of claim 1 in which said different salt is a thiosulfate of an alkali metal.

5. The process of claim 1 in which said different salt is a bisulfite of an alkali metal.

6. A process for polymerizing an organic monomeric material comprising an unsaturated organic compound containing a $CH_2=C<$ group while dispersed in an aqueous medium, which comprises polymerizing such a monomeric material while dispersed in an aqueous medium in the presence of an oxidant and in the presence of an activator composition prepared by dissolving in water a salt of a multivalent metal capable of existing in two valence states under such conditions that it is present at least in part in a lower valence state together with a pyrophosphate of a monovalent cation selected from the class consisting of alkali metals and ammonium and with a reducing salt of a monovalent cation selected from the class consisting of alkali metals and ammonium and of an inorganic anion and which has no adverse effect upon ions of said multivalent metal, heating said solution to 40 to 100° C. for 5 to 90 minutes and subsequently cooling said solution, and adding the cool solution to said aqueous dispersion, the amount of said solution added and the amount of said constituents present in said dispersion being such that, per 100 parts by weight of said monomeric material, there is added 0.01 to 1 millimol part of each of said multivalent metal and pyrophosphate and 0.02 to 1 part of said reducing salt, and said oxidant is present in an amount in excess of one molecular equivalent of said multivalent metal.

7. An improved process for producing synthethic rubber, which comprises polymerizing a monomeric material comprising 1,3-butadiene while dispersed in an aqueous emulsion in the presence of dimethyl (phenyl) hydroperoxymethane as an oxidant and in the presence of an activator composition prepared by dissolving in water ferrous sulfate, sodium pyrophosphate and a hypophosphite of a monovalent cation selected from the class consisting of alkali metals and ammonium, heating said solution to a temperature between 40 and 80° C. for a period of 5 to 90 minutes and cooling said solution, and adding the cool solution to the reaction mixture, the amount of said activator composition added and the amount of said constituents present therein being such that, per 100 parts by weight of said monomeric material, there is added 0.1 to 0.65 millimol parts each of ferrous sulfate, sodium pyrophosphate and separately added dimethyl (phenyl) hydroperoxymethane and 0.02 to one part of said hypophosphite.

8. In the catalytic polymerization of a liquid monomeric material comprising a conjugated diolefin while dispersed in an aqueous emulsion to produce synthetic rubber, in which a polymerization catalyst is used comprising an oxidant and an iron pyrophosphate activator composition, the improvement which comprises using as an activator composition comprising said iron pyrophosphate an aqueous solution prepared by dissolving in water a soluble iron salt under conditions such that at least part of said iron is present in the ferrous state, a pyrophosphate of a monovalent cation selected from the class consisting of alkali metals and ammonium, and a different salt of a monovalent cation selected from the class consisting of alkali metals and ammonium and an inorganic anion which is a reducing agent and has no adverse effect upon iron ions, heating said solution to a temperature between 40 and 100° C. for 5 to 90 minutes and subsequently cooling the resulting solution, and so incorporating said solution in said aqueous emulsion along with said oxidant that there is added, based upon 100 parts by weight of said monomeric material, 0.01 to 3 millimol parts of iron, pyrophosphate, and oxidant and 0.02 to one part of said different salt.

9. In the catalytic polymerization of a monomeric material comprising a conjugated diolefin while dispersed in an aqueous emulsion to produce synthetic rubber, in which a polymerization catalyst is used comprising an oxidant and a pyrophosphate of a multivalent metal capable of existing in two valence states as an activator composition, the improvement which comprises using as said activator composition an aqueous solution prepared by dissolving in water a pyrophosphate of a monovalent cation selected from the class consisting of alkali metals and ammonium, a salt of such a multivalent metal under conditions such that it is present at least in part in a lower valence state, heating said solution to a temperature between 40 and 100° C. for 5 to 90 minutes under conditions such that free oxygen does not have a harmful effect upon said multivalent metal and subsequently cooling the resulting solution, incorporating in said solution during said preparation a different salt of a monovalent cation selected from the class consisting of alkali metals and ammonium and an inorganic anion which is a reducing agent and has no adverse effect upon ions of said multivalent metal, and so incorporating said solution in said polymerization along with said oxidant that there is added, based upon 100 parts by weight of said monomeric material, 0.01 to 3 millimol parts of said multivalent metal, pyrophosphate and oxidant and 0.02 to one part of said different salt.

10. The process of claim 9, wherein said oxidant is an organic hydroperoxide, said multivalent metal is iron and is added to said activator solution as a ferrous salt in the absence of any reductant, and said activator composition and oxidant are separately added to said polymerization in such amounts that there are equimolar amounts of iron and pyrophosphate and a molar excess of said oxidant over said iron.

11. The method of claim 9, wherein said multivalent metal is iron and said anion is selected from the class consisting of hypophosphite, thiosulfate, sulfite, bisulfite and hyposulfite.

12. The process of claim 9 in which said different salt is added to said solution prior to said heating.

13. The process of claim 9 in which said solution is heated in the absence of contact with free oxygen and said different salt is added to said solution subsequent to said heating.

14. An improved method of preparing a solution of iron pyrophosphate, which can be used as an activator solution in the polymerization of a conjugated diolefin while dispersed in an aqueous solution in the presence of an oxidant, which comprises dissolving in water a soluble ferrous salt and a soluble pyrophosphate in equimolar amounts and a salt of a monovalent cation selected from the class consisting of alkali metals and ammonium and an inorganic anion which is a reducing agent and has no adverse effect upon iron ions, each in an amount between 0.1 and 10 parts by weight per 100 parts of water, and heating the resulting solution to a temperature between 40 and 100° C. for 5 to 90 minutes.

15. An improved method of preparing a solution of a pyrophosphate of a multivalent metal capable of existing in two valence states, which can be used as an activator solution in the polymerization of a conjugated diolefin while dispersed in an aqueous emulsion in the presence of an oxidant, which comprises dissolving in water a salt of a multivalent metal, capable of existing in two valence states and under such conditions that it is present at least in part in a lower valence state, a soluble pyrophosphate in an amount at least stoichiometrically equivalent to said multivalent metal, and a different salt of a monovalent cation selected from the class consisting of alkali metals and ammonium and an inorganic anion which is a reducing agent and has no adverse effect upon iron ions, each in an amount between 0.1 and 10 parts by weight per 100 parts of water, and heating the resulting solution to a temperature between 40 and 100° C. for 5 to 90 minutes.

16. The method of claim 15 wherein said multivalent metal is iron, and said heating is at a temperature between 50 and 80° C. for 20 to 60 minutes.

17. The method of claim 15 wherein said multivalent metal is iron and said anion is selected from the class consisting of hypophosphite, thiosulfate, sulfite, bisulfite and hpyosulfite.

18. As a composition of matter, an aqueous solution prepared by dissolving in water a ferrous salt, at least an equimolar amount of a pyrophosphate, and a salt of a monovalent cation selected from the class consisting of alkali metals and ammonium and an inorganic anion which is a reducing agent, with an amount of each between 0.1 and 10 parts by weight per 100 parts of water, and heating said solution to a temperature between 40 and 100° C. for 5 to 90 minutes.

19. The composition of claim 18 wherein said salt is a sulfite.

20. The composition of claim 18 wherein said salt is a hyposulfite.

21. The composition of claim 18 wherein said salt is a thiosulfate.

22. The composition of claim 18 wherein said salt is a bisulfite.

23. As a composition of matter, an aqueous solution prepared by dissolving in water a ferrous salt, at least an equimolar amount of a pyrophosphate, and a hypophosphite of a monovalent cation selected from the class consisting of alkali metals and ammonium, with an amount of each between 0.1 and 10 parts by weight per 100 parts of water, and heating said solution to a temperature between 40 and 100° C. for 5 to 90 minutes.

CARL A. URANECK.
CHARLES M. TUCKER.
WILLARD M. ST. JOHN, Jr.

REFERENCES CITED

The following references are of record in the file of this patent:

UNITED STATES PATENTS

| Number | Name | Date |
|---|---|---|
| 2,366,328 | Fryling | Jan. 2, 1945 |
| 2,367,877 | Layng | Jan. 23, 1945 |
| 2,380,473 | Stewart | July 31, 1945 |
| 2,380,614 | Semon | July 31, 1945 |
| 2,471,938 | Crouch et al. | May 31, 1949 |

OTHER REFERENCES

Merck's Index, 4th ed., Merck & Co., New Jersey (1930), page 281.

Shearon, Jr., et al.: Ind. & Eng. Chem., May 1948, pages 769–777.

Drug and Specialty Formulas, Belanger Chem. Publishing Company (N. Y.), 1941, page 137.